US006914381B2

(12) United States Patent
Okai et al.

(10) Patent No.: US 6,914,381 B2
(45) Date of Patent: Jul. 5, 2005

(54) FLAT PANEL DISPLAY WITH NANOTUBES

(75) Inventors: Makoto Okai, Tokorozawa (JP); Takahiko Muneyoshi, Musashimurayama (JP); Tomio Yaguchi, Sagamihara (JP); Nobuaki Hayashi, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/196,157

(22) Filed: Jul. 17, 2002

(65) Prior Publication Data

US 2003/0117065 A1 Jun. 26, 2003

(30) Foreign Application Priority Data

Dec. 26, 2001 (JP) ....................................... 2001-393108

(51) Int. Cl.[7] .......................... H01J 19/00; H01J 19/24

(52) U.S. Cl. ....................... 313/497; 313/309; 313/336; 313/351

(58) Field of Search ................. 313/309–311, 495–497, 313/351, 346 R, 326, 336; 445/50, 51

(56) References Cited

U.S. PATENT DOCUMENTS

| | | | | | |
|---|---|---|---|---|---|
| 6,339,281 | B2 | * | 1/2002 | Lee et al. | 313/309 |
| 6,440,761 | B1 | * | 8/2002 | Choi | 438/20 |
| 6,515,415 | B1 | * | 2/2003 | Han et al. | 313/496 |
| 6,545,396 | B1 | * | 4/2003 | Ohki et al. | 313/309 |
| 6,628,053 | B1 | * | 9/2003 | Den et al. | 313/310 |
| 6,650,061 | B1 | * | 11/2003 | Urayama et al. | 315/169.3 |
| 6,664,727 | B2 | * | 12/2003 | Nakamoto | 313/495 |
| 2003/0090190 | A1 | * | 5/2003 | Takai et al. | 313/311 |

OTHER PUBLICATIONS

Choi, W.B., et al., "L2.1: Late–News Paper: A 4.5–in. Fully Sealed Carbon Nanotube–Based Field–Emission Flat–Panel Display", *SID 99 Digest,* 1999, pp. 1134–1137.

* cited by examiner

*Primary Examiner*—Ashok Patel
(74) *Attorney, Agent, or Firm*—Miles & Stockbridge P.C.

(57) ABSTRACT

A flat panel display includes an electron emitter plate provided with electron emitters, a phosphor plate provided with phosphors and a space defined by the electron emitter plate and the phosphor plate for form a substantial vacuum atmosphere therebetween, wherein a great number of fine recess structures are formed on the surface of a metal film formed on the electron emitter plate, and fine fibered substances or carbon nanotubes or substances containing the fine fibered substances or carbon nanotubes are arranged on the fine recess structures to form electron emitters.

19 Claims, 16 Drawing Sheets

PLANE VIEWS
SECTIONAL VIEWS
SECTIONAL VIEW
504
VB
VB
504
501
VB-VB

505
VD
VD
505
VD-VD
503

502
502
VF
VF
VF-VF

502
VJ
VJ
502
502
VH
VH
VH-VH
VJ-VJ
505
505

PLANE VIEWS

SECTIONAL VIEWS

PLANE VIEWS

SECTIONAL VIEWS

PLANE VIEWS

SECTIONAL VIEWS

PLANE VIEWS
SECTIONAL VIEWS
SECTIONAL VIEW
1001
XB
XB
1001
XB-XB

1005
XD
XD
1005
XD-XD
1003

1002
1002
XF
XF
XF-XF 1002
1002
1002
XJ
XJ
XH
XH
XH-XH
1006
XJ-XJ
1005
1005

FIG.12A
FIG.12B
PLANE VIEWS
SECTIONAL VIEWS
SECTIONAL VIEW
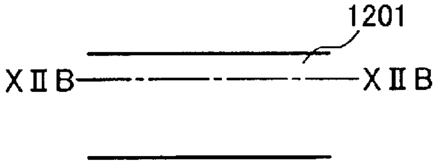
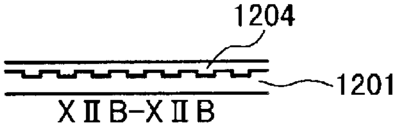
FIG.12C
FIG.12D
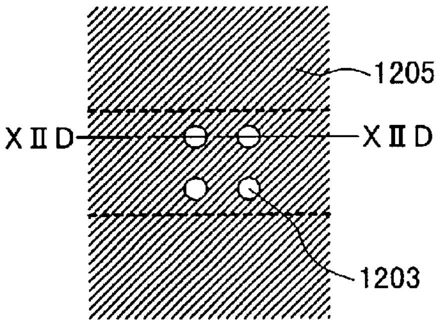
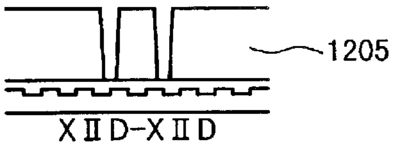
FIG.12E
FIG.12F
FIG.12G
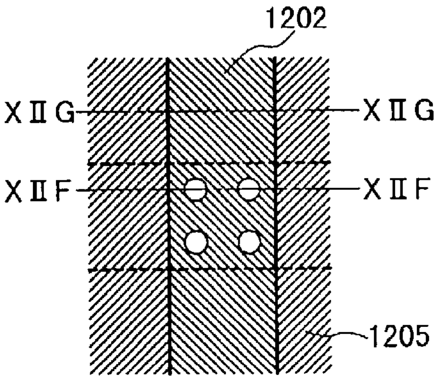
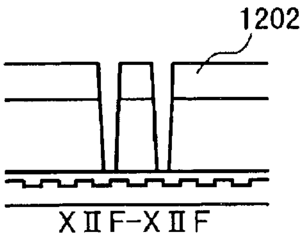
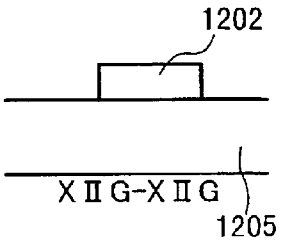

PLANE VIEWS SECTIONAL VIEWS SECTIONAL VIEW

FLAT PANEL DISPLAY WITH NANOTUBES

BACKGROUND OF THE INVENTION

The present invention relates to a spontaneously luminescent type flat panel display using, as electron emitters, substances having a fine fibered structure such as carbon nanotubes.

Conventionally, when substances having fine fibered structures such as carbon nanotubes are used as electron emitters, a method has been used generally in which the fine fibered substances are mixed with, for example, metal fine particles, resin and glass and a resulting mixture is printed on a substrate. An example of fabricating a 4.5-inch spontaneous luminescent type flat panel display by using this method is described in SID 99 Digest, pp. 1134–1137.

SUMMARY OF THE INVENTION

In this method, however, the ratio of part of carbon nanotubes which is oriented in a direction vertical to the substrate and on which an electric field is liable to be concentrated is small, with the result that the electron emission point density is low, amounting to 100 electrons/$cm^2$ or less, to make it difficult to obtain uniform electron emission characteristics in a plane. Further, resin and glass intrude into a portion where a metal fine particle contacts a fine fibered substance and as a result, the contact resistance between the metal fine particle and the fine fibered substance becomes large and the ratio of part of fine fibered substances which makes contact to the metal fine particles is reduced drastically, raising a problem that the electron emission point is further degraded.

According to the present invention, fine recess structures are formed on a metal film prepared on an electron emitter substrate and the fine fibered substances or carbon nanotubes are arranged on the fine recess structures, thereby ensuring that most of the fine fibered substances or carbon nanotubes can be oriented vertically to the substrate. With this construction, the electric field can be concentrated on most of the fine fibered substances or carbon nanotubes to drastically increase the electron emission point density and uniform electron emission characteristics can be realized in a plane.

Other objects, features and advantages of the invention will become apparent from the following description of the embodiments of the invention taken in conjunction with the accompanying drawings.

BRIEF DESCRIPTION OF THE DRAWINGS

FIGS. 12A to 12G are diagrams for explaining the electron emitter plate of the fifth embodiment of the invention.

DESCRIPTION OF THE EMBODIMENTS

Figure 1:
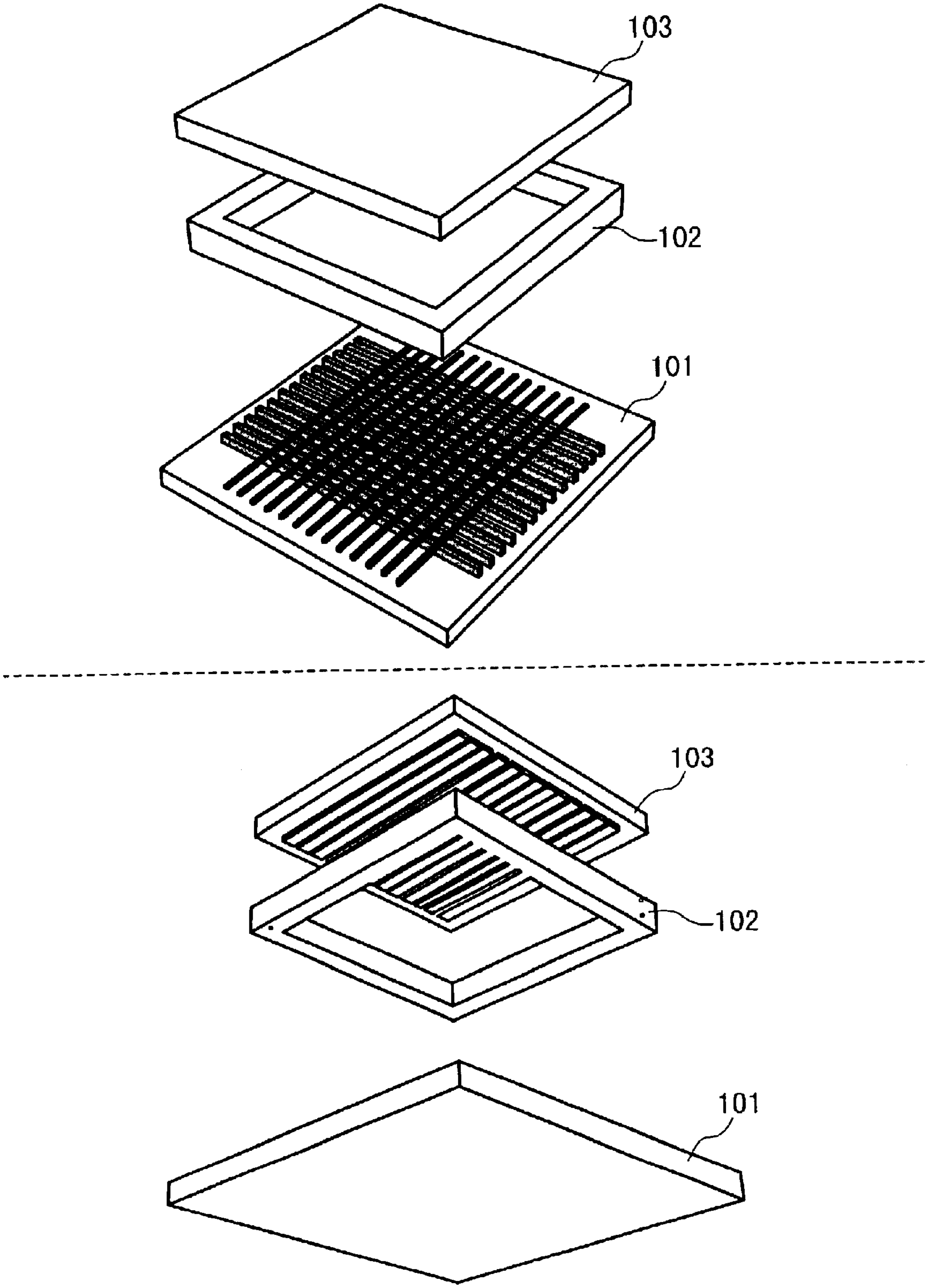
FIG. 1 is a diagram for explaining a construction of a flat panel display of a first embodiment of the invention.

Referring to FIGS. 1, 2, 3, 4A to 4C, 5A to 5I and 6A to 6H as well as FIGS. 17 and 18, a first embodiment of the present invention will now be described. Firstly, the overall construction of a flat panel display of spontaneous luminescent type according to the invention will be described with reference to FIG. 1. The present display comprises an electron emitter plate 101 provided with electron emitter arrays, a phosphor plate 103 provided with phosphor stripes or dots in register with electron emitters, and a glass frame 102 for fixing the electron emitter plate 101 and phosphor plate 103 by spacing them at a constant distance. Although not illustrated, a spacer for keeping the electron emitter plate 101 and phosphor plate 103 spaced needs to be provided inside the glass frame as the screen size increases.

Figure 2:
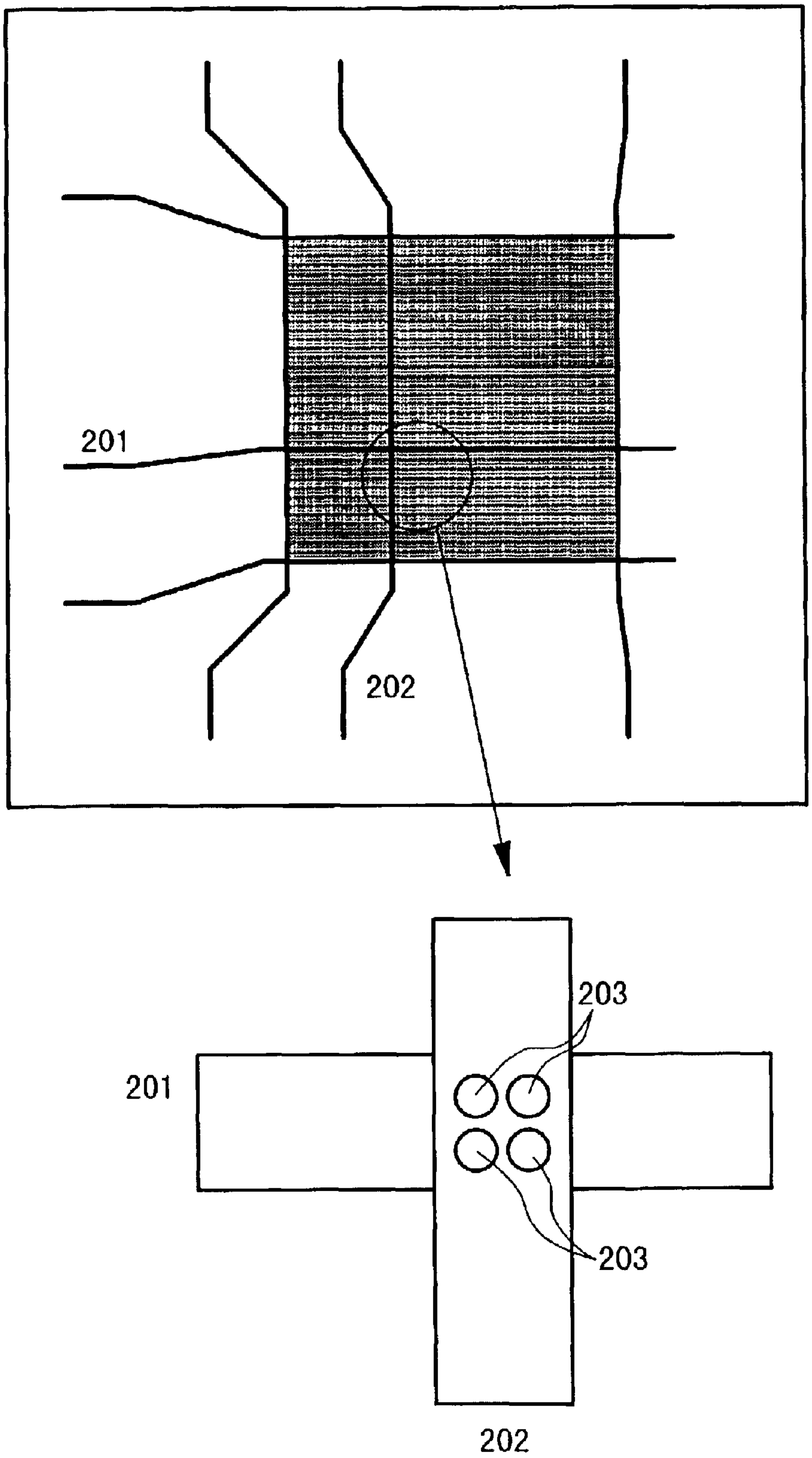
FIG. 2 is a diagram for explaining a structure of electron emitter plate of the first embodiment of the invention.

Next, the structure of the electron emitter plate will be described with reference to FIG. 2. A plurality of cathode electrode stripes 201 are formed in the horizontal direction and a plurality of gate electrode stripes 202 are formed in the vertical direction. The cathode electrode stripes 201 intersect the gate electrode stripes 202 through an insulating film sandwiched therebetween and electron emitters 203 are formed at individual intersections. Each electron emitter is formed on the surface of the cathode electrode stripe 201 at the bottom of a hole passing through the gate electrode stripe 202 and the underlying insulating film.

Figure 3:
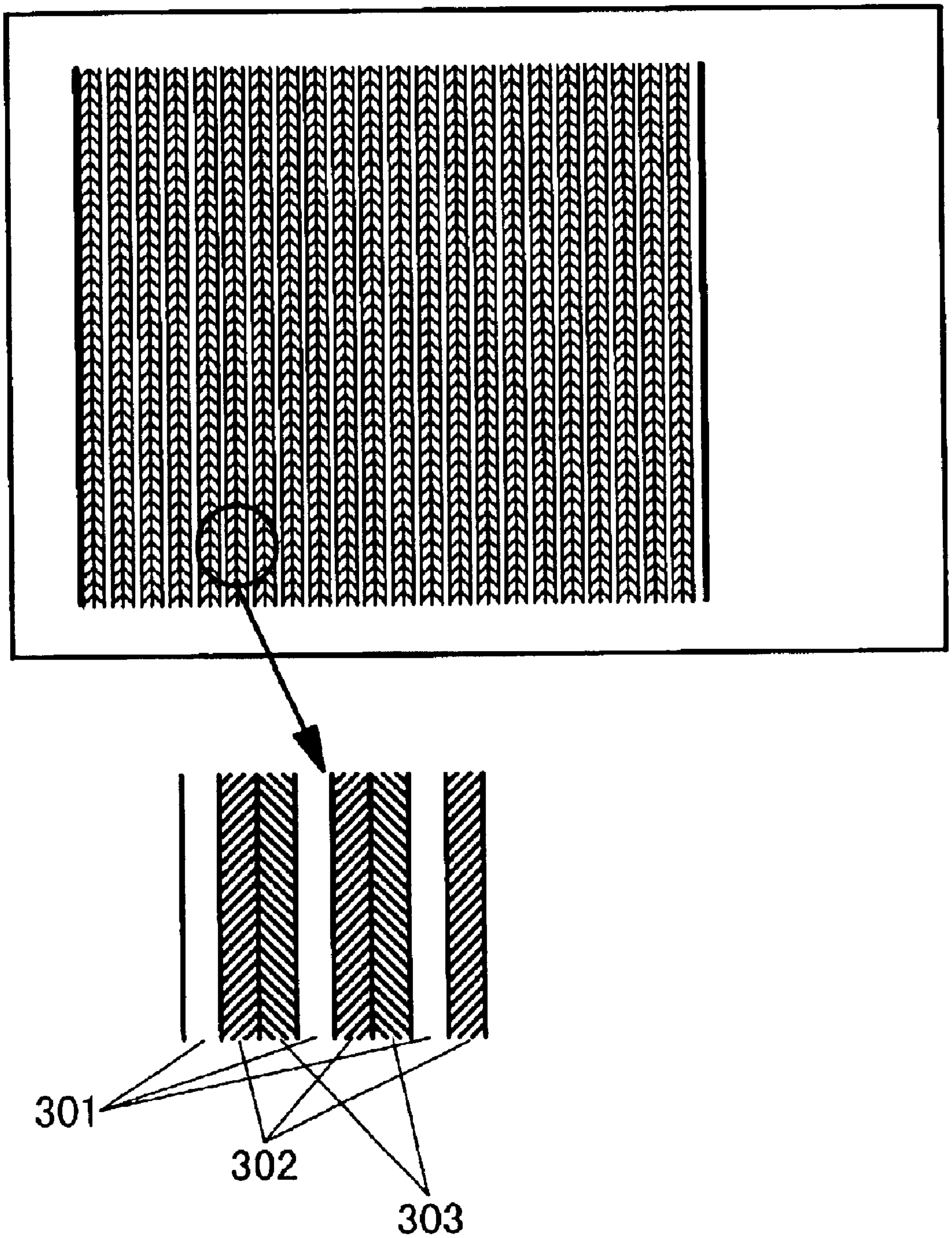
FIG. 3 is a diagram for explaining a phosphor plate of the first embodiment of the invention.

Referring now to FIG. 3, the structure of the phosphor plate will be described. Structurally, phosphor stripes for red, green and blue colors are formed in register with the electron emitters. Firstly, stripes of a black matrix are prepared through lift-off process at central positions of electron emitters in commensurate with the pitch between adjacent electron emitters in the horizontal direction. Next, a repetitive stripe pattern of phosphor stripes of red 301, green 302 and blue 303 is formed through slurry process. The individual phosphor stripes are disposed in the center of adjacent black matrix stripes on both sides. Although not illustrated, aluminum is vapor deposited to a thickness of 50 nm over the entire surface after the phosphor stripes have been prepared, thus forming an anode electrode.

The electron emitter plate and phosphor plate prepared or fabricated as above are so disposed as to oppose each other through a constant space by using the glass frame glass, the electron emitters and phosphor stripes are brought into register with each other and thereafter, the interior of a resulting structure is evacuated to a substantial vacuum and sealed with frit glass to form a panel. Then, an image can be displayed by applying a scanning signal to the anode electrode stripe and an image signal to the gate electrode stripe as well as an acceleration voltage, positive relative to the cathode electrode, to the anode electrode of the phosphor plate.

Figure 4A:
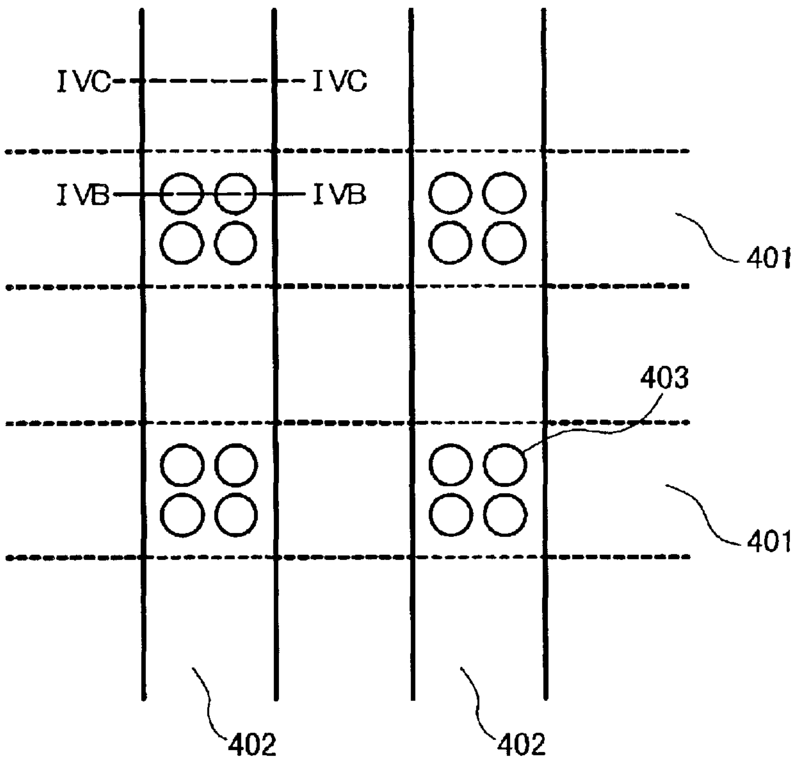
FIGS. 4A to 4C are diagrams for explaining a detailed structure of the electron emitter plate of the first embodiment of the invention.
Figure 4B:
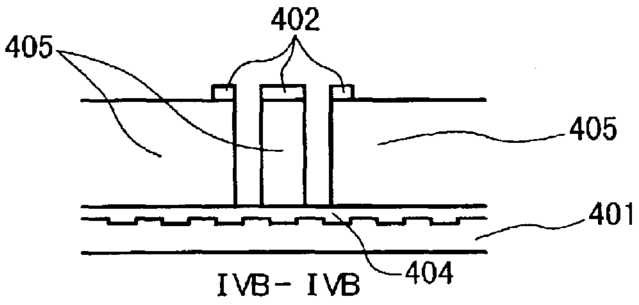
Figure 4C:
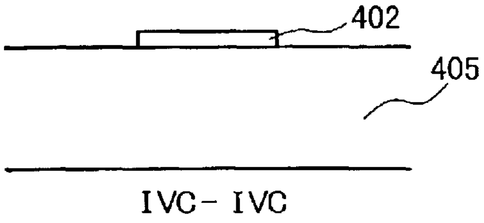

Referring now to FIGS. 4A to 4C, the detailed structure of the electron emitter plate will be described. FIG. 4A is a plane view, FIG. 4B is a sectional view indicated by IVB—IVB on FIG. 4A and FIG. 4C is a sectional view indicated by IVC—IVC on FIG. 4A. Firstly, 600 cathode electrode stripes 401 each having a thickness of 0.2 to 10 μm and a width of 300 μm are formed at intervals of 60 μm on the surface of the glass substrate.

Subsequently, fine fibered substances such as carbon nanotubes are overlaid on each cathode electrode stripe, thus forming an electron emitter stripe 404 on the cathode electrode stripe 401. The electron emitter stripe 404 may be patterned such that the electron emitter stripe exists at least at the bottoms of electron emitter holes. Thereafter, an insulating layer 405 is formed. The insulating layer 405 has a thickness of 1 to 50 μm and structurally, it is formed with electron emitter holes 403 each having a diameter of 1 to 50 μm at each intersection of the cathode electrode stripe 401 and gate electrode stripe 402. After the insulating layer 405 is sintered at 550° C., 2400 gate electrode stripes 402 each having a thickness of 0.2 to 10 μm and a width of 90 μm are formed at intervals of 30 μm on the sintered insulating layer. It is to be noted that structurally, the gate electrode stripe 402 is also formed with the same electron emitter holes 403 as those in the insulating layer 405 at each intersection of the cathode electrode stripe 401 and gate electrode stripe 402.

With the wiring structure fabricated as above, an image can be displayed by inputting a scanning signal to the cathode electrode stripe 401 and an image signal to the gate electrode stripe structure 402 and further applying an acceleration voltage between the cathode electrode stripe 401 and the anode electrode provided on the phosphor plate of FIG. 3. According to the gate structure of the present invention, the distance between the gate electrode and the tip of fine carbon fibers such as carbon nanotubes can be controlled in μm orders and consequently, a low gate operating voltage (10 V or less) can be obtained.

Figures 5A, 5B, 5C, 5D, 5E, 5F, 5G, 5H, 5I:
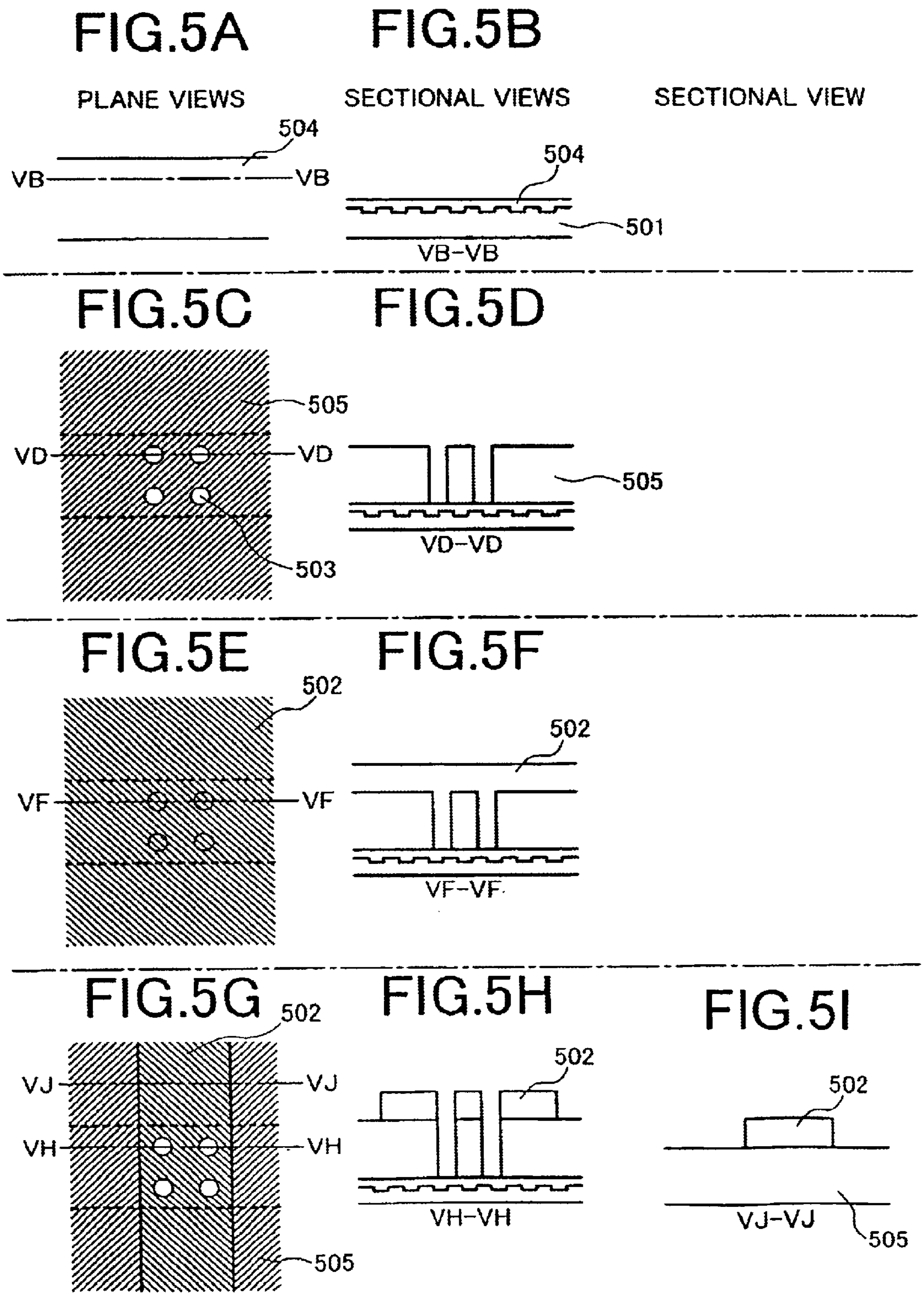
FIGS. 5A to 5I are diagrams for explaining the electron emitter plate of the first embodiment of the invention.
Figure 6A:
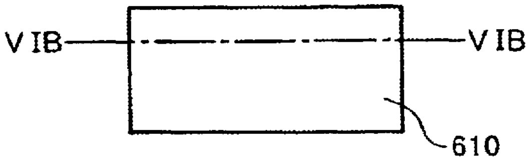
FIGS. 6A to 6H are diagrams for explaining a fine recess structure of the first embodiment of the invention.
Figure 6B:
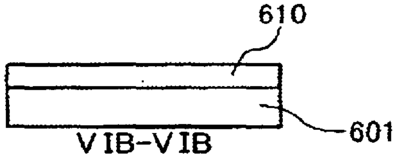
Figure 6C:
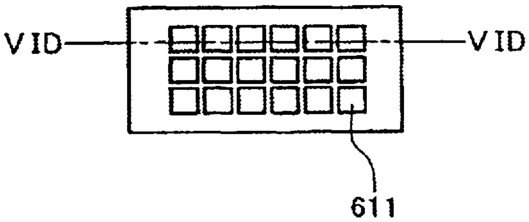
Figure 6D:
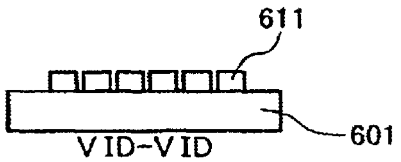
Figure 6E:
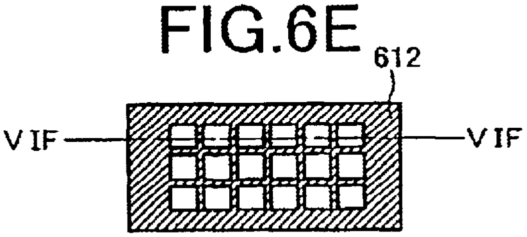
Figure 6F:
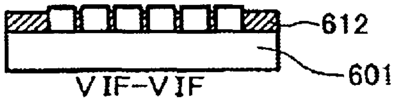

Referring now to FIGS. 5A to 5I and FIGS. 6A to 6H, details of an electron emitter fabrication process will be described. Firstly, the fabrication process will be described with reference to FIGS. 5A to 51. As shown in FIG. 5A as a plane view and FIG. 5E as a sectional view indicated by VB—VB on FIG. 5A, 600 cathode electrode stripes 502, each having a width of 300 μm are formed at intervals of 60 μm on the glass substrate. Subsequently, fine recess structures are formed on the surface of each cathode electrode stripe 501 and thereafter an electron emitter stripe 504 is formed. A method for formation of the fine recess structures will be described with reference to FIGS. 6A to 6E. As shown in FIG. 6A as a plane view and FIG. 6B as a sectional view indicated by VIB—VIB on FIG. 6A, photo resist 610 is coated on the surface of the electron emitter stripe 601. Thereafter, the ordinary photolithography process is applied to form a photo-resist pattern 611 in which cubes of 2 μm square are arrayed at intervals of 0.5 μm as shown in FIG. 6C as a plane view and FIG. 6D as a sectional view indicated by VID—VID on FIG. 6C. Then, as shown in FIG. 6E as a plane view and FIG. 6F as a sectional view indicated by VIF—VIF on FIG. 6E, a gold plated pattern 612 is formed through ordinary electrolytic plating process by taking advantage of a photo-resist pattern mask.

Figure 6G:
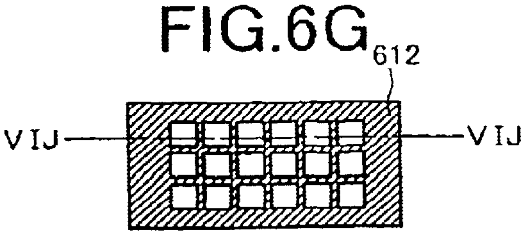
Figure 6H:
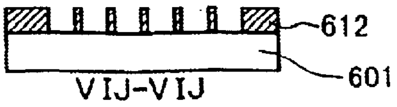

Finally, the photo-resist pattern is removed by an oxygen plasma process to complete recess structures based on the gold plated pattern 612 as shown in FIG. 6G as a plane view and FIG. 6H as a sectional view indicated by VIH—VIH on FIG. 6G. The gold plated pattern has a height of 1 μm. The gold plated pattern as above may be prepared over the entire surface of the cathode electrode Stripe 610 but alternatively, its formation over the entirety of bottom surfaces of the individual electron emitter holes may suffice. In this case, the gold plated pattern 612 needs to be formed in an area about 10 μm larger than the electron emitter hole pattern by taking the process margin into consideration.

Reverting to FIGS. 5A to 5I, the fabrication process will be described. As shown in FIG. 5A, a solution containing multi-walled carbon nanotubes of 3 μm average length by 0.1 mg/ml concentration is coated, through ink jet process, on the striped cathode electrode 501 having the fine recess structure formed on its surface by the method shown in FIGS. 6A to 6H, thereby forming the electron emitter layer 504. Here, carbon nanotubes pulverized to have their lengths shortened are used. An example of the distribution of the lengths is shown in FIG. 18. Carbon nanotubes in originally prepared condition have an average length of about 10 μm but when they are pulverized mechanically, their average length could be shortened to about 1 μm as shown in FIG. 18.

Figure 17:
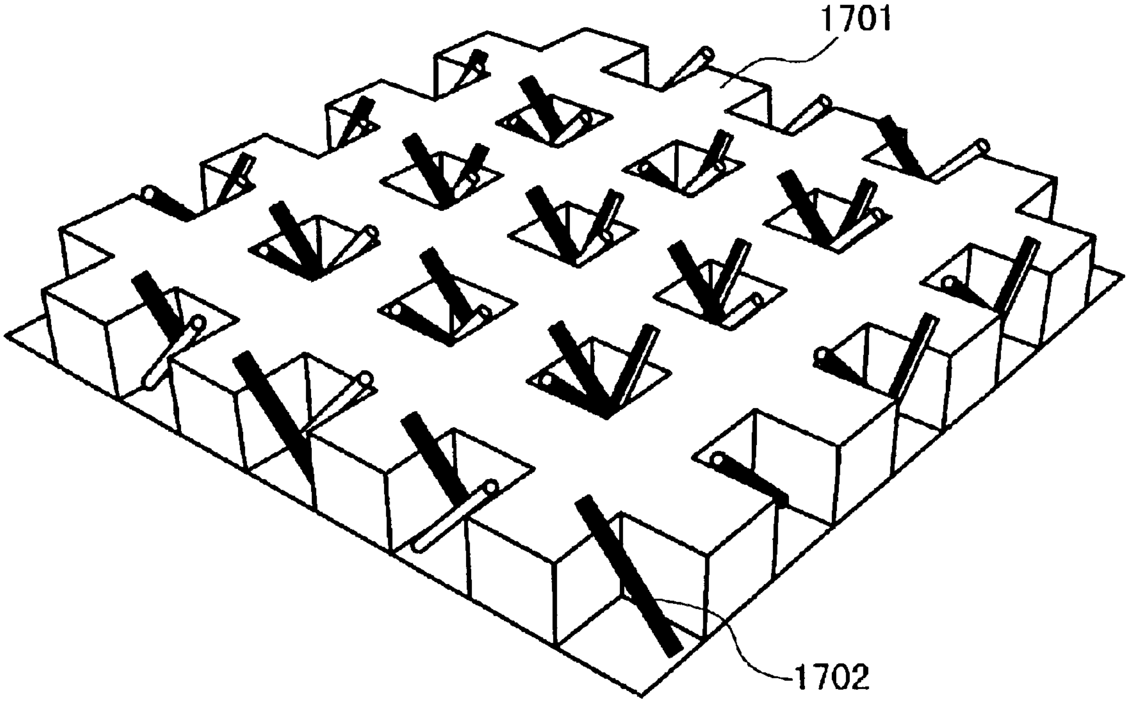
FIG. 17 is a perspective view useful in explaining a structure of a gold plated pattern and carbon nanotubes of the first embodiment.
Figure 18:
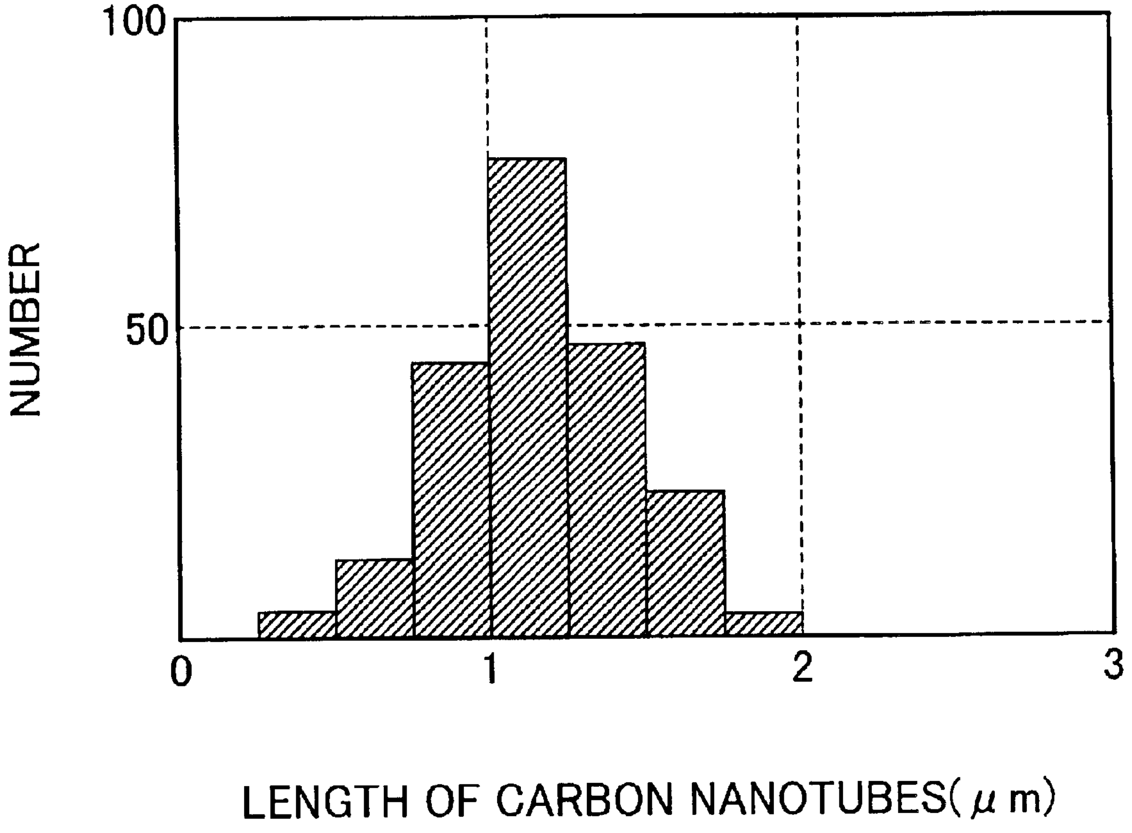
FIG. 18 is a graph showing the distribution of lengths of carbon nanotubes after cutting.

By preparing the electron emitter layer 504 in this manner, the carbon nanotubes 1702 can be arranged vertically to the substrate as shown in FIG. 17 by using the gold plated pattern 1701 as a support. The gold plated pattern 1701 of FIG. 17 is prepared by the method shown in FIGS. 6A to 6D. Since it has a hole depth of 1 μm, the carbon nanotubes 1702 of 1 μm average length could be oriented effectively in a direction vertical to the substrate planar surface. The electron emitter stripe 504 may be prepared over the entire surface of the substrate or over the entire surface of the cathode electrode stripe 501 but it may suffice that the electron emitter stripe 504 is formed over the entirety of bottom surfaces of the individual electron emitter holes or over part of the surface of cathode electrode which is formed with the fine uneven structures.

Next, after photosensitive dielectric paste is screen-printed over the entire surface, electron emitter holes 503 are formed through ordinary photolithography process. A resulting structure is sintered at 550° for 30 minutes in the atmosphere to form an insulating layer 505. As shown in FIG. 5C as a plane view and FIG. 5D as a sectional view indicated by VD—VD on FIG. 5C, the insulating layer 505 has a thickness of 10 μm and the electron emitter hole 503 has a diameter of 10 μm. The surface fine structures of cathode electrode stripe 504 and electron emitter layer 504 are so positioned as to be in register with the bottoms of the electron emitter holes 503.

Next, as shown in FIG. 5E as a plane view and FIG. 5F as a sectional view indicated by VF—VF on FIG. 5E, photosensitive silver paste 502 is screen-printed over the entire surface. Then, gate electrode stripes 502 are formed through ordinary photolithography process as shown in FIG. 5G as a plane view, FIG. 5H as a sectional view indicated by VH—VH on FIG. 5G and FIG. 5I as a sectional view indicated by V(I)—V(I) on FIG. 5G and a resulting structure is sintered at 500° for 30 minutes in the atmosphere. The gate electrode stripes 502 amounting to 2400 in number and having each a width of 90 μm are formed at intervals of 30 μm. Each gate electrode stripe has a thickness of 5 μm and is formed with hole structures, of the same or slightly larger size than that of the hole structures in the insulating layer 505, in register with them.

With the wiring structure fabricated as above, an image can be displayed by inputting a scanning signal to the cathode electrode stripe 501 and an image signal to the gate electrode stripe structure 502 and further applying an acceleration voltage between the cathode electrode stripe 501 and the anode electrode provided on the phosphor plate of FIG. 3.

Further, according to the gate structure of the present invention, the distance between the gate electrode and the tip of the fine carbon fibers such as carbon nanotubes can be controlled in μm orders and a low gate operating voltage (10 V or less) can be obtained. In addition, since the density of the fine fibered structure substances or carbon nanotubes oriented vertically to the substrate can be increased drastically, uniform electron emission characteristics having an electron emission point density of 10,000 electrons/$cm^2$ or more can be realized.

In the present embodiment, the cathode electrode stripe 501 and gate electrode stripe 502 are both formed from Ag but any metal having necessary electric conduction properties can be used. Alloy may also be used.

The method for coating the carbon nanotubes on desired positions through ink jet process has been used but paste containing carbon nanotubes may be prepared and it may be screen-printed. Coating over the entire surface can also be accomplished by spinner coating.

Furthermore, while the gold plated structures each having one side length of 2 μm and a height of 2 μm and formed at intervals of 0.5 μm are used as the surface uneven structures of the cathode electrode stripe 501 and the multi-wall carbon nanotubes of 3 μm average length are used as the carbon nanotubes, any fine uneven structures and fine fibered substances or carbon nanotubes may also be used provided that the recess structure has a depth of 3 μm or less.

Figure 7A:
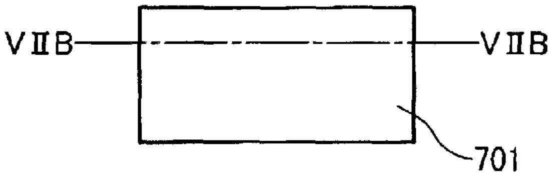
FIGS. 7A to 7D are diagrams for explaining a fine recess structure of a second embodiment of the invention.
Figure 7B:
Figure 7C:
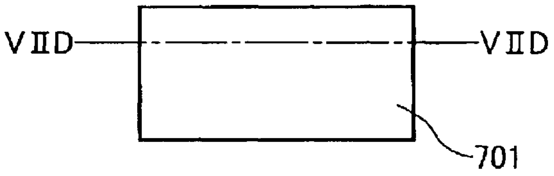
Figure 7D:
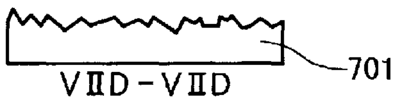

Next, a second embodiment of the invention will be described with reference to FIG. 7A as a plane view and FIG. 7B as a sectional view indicated by VIIB—VIIB on FIG. 7A, and FIG. 7C as a plane view and FIG. 7D as a sectional view indicated by VIID—VIID on FIG. 8C. The second embodiment differs from the first embodiment in the method for formation of fine recess structures on the surface of the cathode electrode.

Firstly, by screen-printing Ag paste onto a glass substrate, 600 cathode electrode stripes 701 each having a width of 300 μm are formed at intervals of 60 μm. Subsequently, fine uneven structures are formed on the surface of each cathode electrode stripe 701 through sputter etching process based on argon gas.

A resulting structure is sintered at 500° for 30 minutes in the atmosphere. The film thickness after sintering is 5 μm. The fine recess structures have average recess depth and average recess inlet size that can be controlled in accordance with the kind of sputter gas and sputtering conditions. In the present instance, sputter etching is carried out in such a manner that the average recess depth amounts to 2 μm and the average recess inlet size amounts to 2 μm. The succeeding steps are quite the same as those in the first embodiment.

In the present embodiment, the cathode electrode stripe and gate electrode stripe are both formed from Ag but any metal having necessary electric conduction properties can also be used. Alloy may also be used.

The method for coating carbon nanotubes to desired positions through ink jet process has been used but paste containing carbon nanotubes may be prepared and it may be screen-printed. Coating over the entire surface can also be accomplished by spinner coating.

While the recess structures each having 2 μm average recess depth and 2 μm average recess inlet size are used as the surface recess structures of the cathode electrode stripe 701 and the multi-wall carbon nanotubes of 3 μm average length are used as the carbon nanotubes, any fine recess structures and fine fibered substances or carbon nanotubes may also be used provided that the recess structure has a depth of 3 μm or less.

Next, a third embodiment of the invention will be described with reference to FIG. 8A as a plane view and FIG. 8B as a sectional view indicated by VIIIB—VIIIB on FIG. 8A, and FIG. 8C as a plane view and FIG. 8D as a sectional view indicated by VIIID—VIIID on FIG. 8C.

The third embodiment differs from the first embodiment in the method for formation of fine recess structures on the surface of the cathode electrode. Firstly, 600 cathode electrode stripes each having a width of 300 μm are formed at intervals of 60 μm by screen-printing Ni paste containing Ni fine particles of 1 μm average diameter on a glass substrate. A resulting structure is sintered at 550° for 30 minutes in the atmosphere, thus having a film thickness of 10 μm.

Figure 8A:
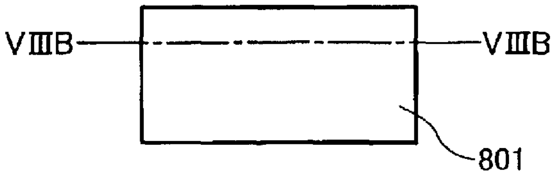
FIGS. 8A to 8D are diagrams for explaining a fine recess structure of a third embodiment of the invention.
Figure 8B:
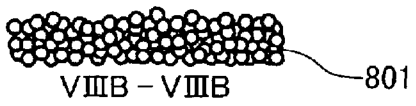

FIG. 8A shows a plane view and FIG. 8B shows a sectional view indicated by VIIIB—VIIIB on FIG. 8A of the cathode electrode stripe 801. Subsequently, gold is vapor-deposited on the entire surface to a thickness of 0.1 μm and thereafter, the ordinary photolithography process and the ensuing wet etching process are applied to remove surplus unnecessary gold, thus forming a conduction layer 810 on the surface of the cathode electrode stripe 801.

Figure 8C:
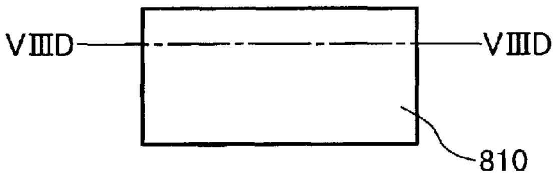
Figure 8D:
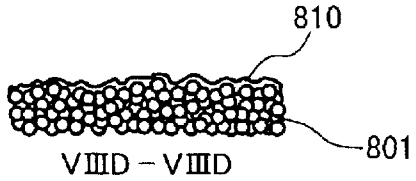

FIG. 8C shows a plane view and FIG. 8D shows a sectional view indicated by VIIID—VIIID on FIG. 8C of the cathode electrode stripe 801 having its surface formed with the conduction layer 810. Fine recess structures prepared in this manner have an average recess depth of 1.5 μm and an average recess opening diameter of 1 μm. The succeeding fabrication processes are quite the same as those in the first embodiment.

In the present embodiment, the cathode electrode stripe is formed from Ni and the gate electrode stripe is formed from Ag but any metal having necessary electric conduction properties can also used. Alloy may also be used.

The method for coating the carbon nanotubes to desired positions through ink jet process has been used but paste containing carbon nanotubes may be prepared and it may be screen-printed. Coating over the entire surface can also be accomplished by spinner coating.

Further, while the recess structures each having 1.5 μm average recess depth and 1 μm average recess inlet size are used as the surface recess structures of the cathode electrode stripe 801 and the multi-wall carbon nanotubes of 3 μm average length are used as the carbon nanotubes, any fine recess structures and fine fibered substances or carbon nanotubes may also be used provided that the recess structure has a depth of 3 μm or less.

Figure 9A:
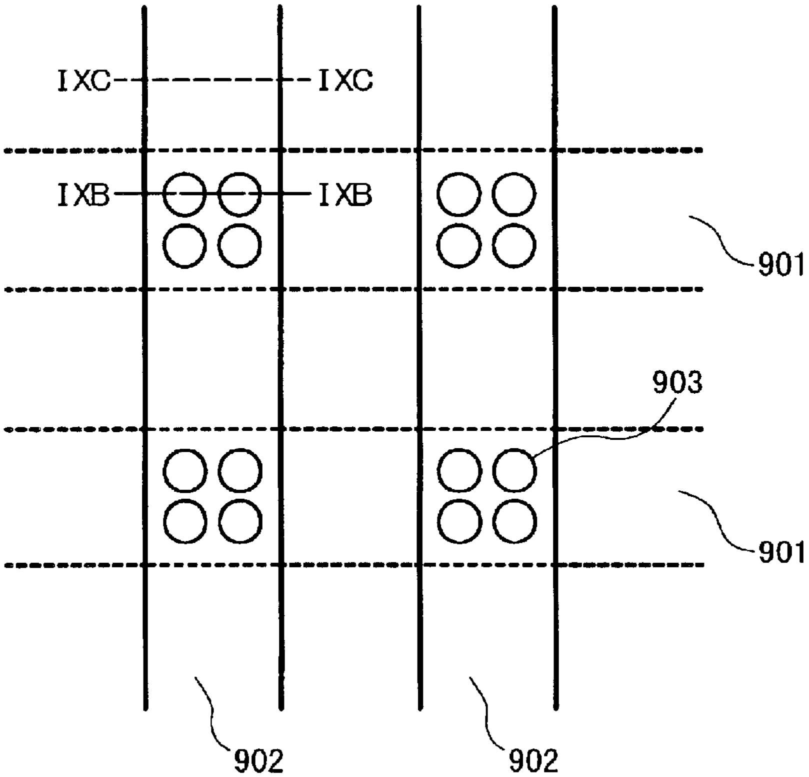
FIGS. 9A to 9C are diagrams for explaining a detailed structure of the electron emitter plate of a fourth embodiment of the invention.
Figure 9B:
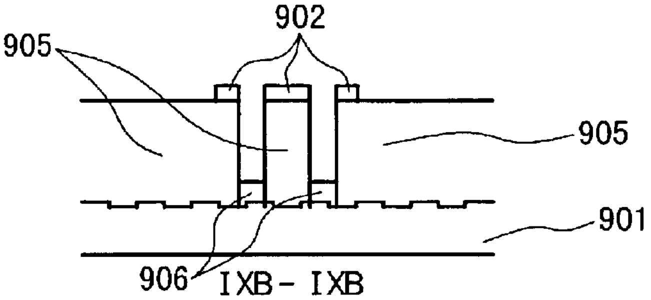
Figure 9C:
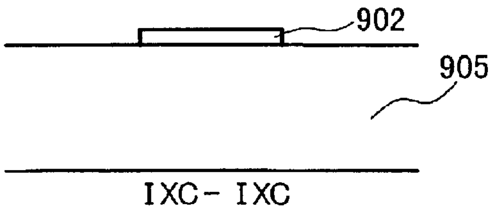

Next, a fourth embodiment of the invention will be described with reference to FIGS. 9A to 9C and FIGS. 10A to 10I. Referring first to FIGS. 9A to 9C, the structure of the electron emitter plate will be described. FIG. 9A is a plane view, FIG. 9B is a sectional view indicated by IXB—IXB on FIG. 9A and FIG. 9C is a sectional view indicated by IXC—IXC on FIG. 9A.

Firstly, 600 cathode electrode stripes 901 each having a thickness of 0.2 to 10 μm and a width of 300 μm are formed at intervals of 60 μm on the surface of a glass substrate. Subsequently, an insulating layer 905 is formed. The insulating layer 905 has a thickness of 1 to 50 μm and structurally, it is formed with electron emitter holes 903 each having a diameter of 1 to 50 μm at each intersection of the cathode electrode stripe 901 and gate electrode stripe 902. After the insulating layer 905 is sintered at 550° C., 2400 gate electrode stripes 902 each having a thickness of 0.2 to 10 μm and a width of 90 μm are formed at intervals of 30 μm on the sintered insulating layer.

Structurally, the gate electrode stripe 902 is also formed with the same electron emitter holes 903 as those in the insulating layer 905 at each intersection of the cathode electrode stripe 901 and gate electrode stripe 902. Finally, electron emitter layers 906 each containing the fine fibered structure substances or carbon nanotubes are formed on the bottoms of the respective electron emitter holes 903.

With the wiring structure fabricated as above, an image can be displayed by inputting a scanning signal to the cathode electrode stripe 901 and an image signal to the gate electrode structure stripe 902 and further applying an acceleration voltage between the cathode electrode stripe 901 and the anode electrode provided on the phosphor plate of FIG. 3.

Figures 10A, 10B, 10C, 10D, 10E, 10F, 10G, 10H, 10I:
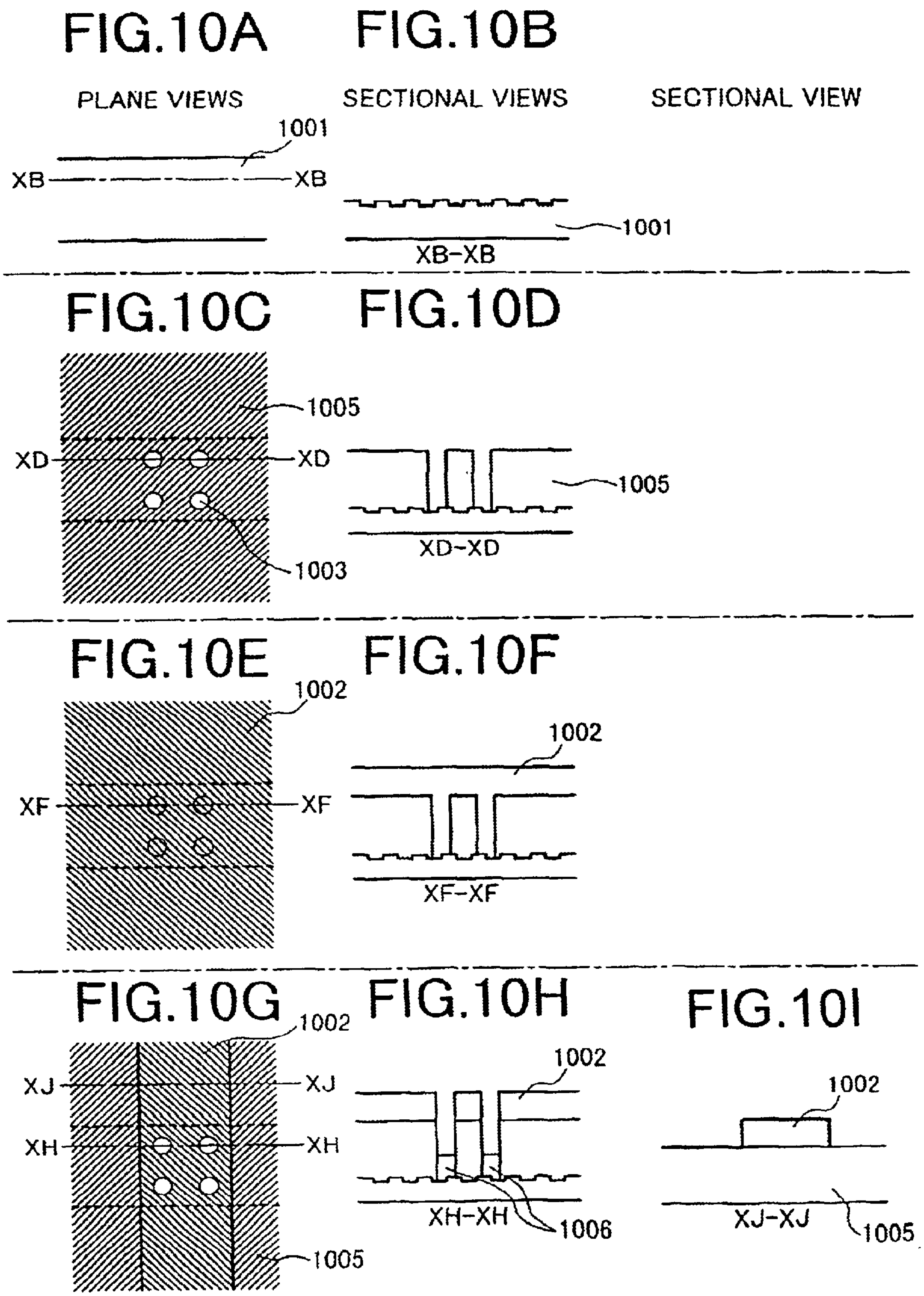
FIGS. 10A to 10I are diagrams for explaining the electron emitter plate of the fourth embodiment of the invention.

According to the gate structure of the invention, the distance between the gate electrode and the tip of fine carbon fibers such as carbon nanotubes can be controlled in μm orders and therefore, a low gate operating voltage (10 V or less) can be realized. Next, details of an electron emitter fabrication process will be described with reference to FIGS. 10A to 10D. As shown in FIG. 10A as a plane view and FIG. 10B as a sectional view indicated by XB—XB on FIG. 10A, 600 cathode electrode stripes 1001 each having a width of 300 μm are formed at intervals of 60 μm on a glass substrate.

Subsequently, fine recess structures are formed on the surface of each cathode electrode stripe 1001. Any one of the gold plating method of FIGS. 6A to 6H, the sputter etching method of FIGS. 7A to 7C and the fine particle paste printing method of FIGS. 8A to 8C may be used as a method for formation of the fine recesses. Then, after photosensitive dielectric paste is screen-printed on the entire surface, electron emitter holes 1003 are formed through ordinary photolithography process.

A resulting structure is sintered at 550° for 30 minutes in the atmosphere to form an insulating layer 1005. As shown in FIG. 10C as a plane view and FIG. 10D as a sectional view indicated by XD—XD on FIG. 10C, the insulating layer 1005 has a thickness of 10 μm and the electron emitter hole 1003 has a diameter of 10 μm.

Next, as shown in FIG. 10E as a plane view and FIG. 10F as a sectional view indicated by XF—XF on FIG. 101, photosensitive silver paste is screen-printed on the entire surface. Then, through the ordinary photolithography process, gate electrode stripes 1002 are formed as shown in FIG. 10G as a plane view, FIG. 10H as a sectional view indicated by XH—XH on FIG. 10G and FIG. 10I as a sectional view indicated by X(I)—X(I) on FIG. 10G and a resulting structure is sintered at 500° for 30 minutes in the atmosphere.

In this instance, 2400 gate electrode stripes 1002 each having a width of 90 μm are formed at intervals of 30 μm. The gate electrode stripe has a thickness of 5 μm and is formed with holes each having the same or larger size than that of the holes in insulating layer 1005 in register therewith.

Finally, a solution containing the fine fibered structure substances or carbon nanotubes is applied through ink jet process to form electron emitter layers 1006 on the bottoms of the respective electron emitter holes 1003.

The fine fibered structure substances or carbon nanotubes have an average length of 2 μm and the recess of the fine recess structures formed on the surface of the cathode electrode 1001 has an average depth of 1 μm and an average opening diameter of 1 μm. Through this process, the fine fibered structure substances or carbon nanotubes could be oriented vertically to the substrate.

With the wiring structure fabricated as above, an image can be displayed by inputting a scanning signal to the cathode electrode stripe 1001 and an image signal to the gate electrode stripe structure 1002 and further applying an acceleration voltage between the cathode electrode stripe 1001 and the anode electrode provided on the phosphor plate of FIG. 3.

According to the gate structure of the invention, since the distance between the gate electrode and the tip of the fine carbon fibers such as carbon nanotubes can be controlled in μm orders, a low gate operating voltage (10 V or less) can be realized. Further, since the density of the fine fibered structure substances or carbon nanotubes oriented vertically to the substrate is increased drastically, uniform electron emission characteristics having an electron emission density of 10,000 electrons/cm$^2$ or more can be realized.

In the present embodiment, the cathode electrode stripe 1001 and gate electrode stripe 1002 are formed from a specified metal but any metal having necessary electric conduction properties can also be used. Alloy may also be used.

The method for coating nanotubes to desired positions through ink jet process has been used but the carbon nanotubes can be arranged on the bottom of the electron emitter hole 1003 by any other method.

Further, the surface recess structures of cathode electrode stripe 1001 each having 1 μm average recess depth and 1 μm average recess opening diameter are used and the carbon nanotubes having 2 μm average length are used but any fine recess structures and fine fibered substances or carbon nanotubes may also be used provided that the recess structure has a depth of 3 μm or less.

Figure 11A:
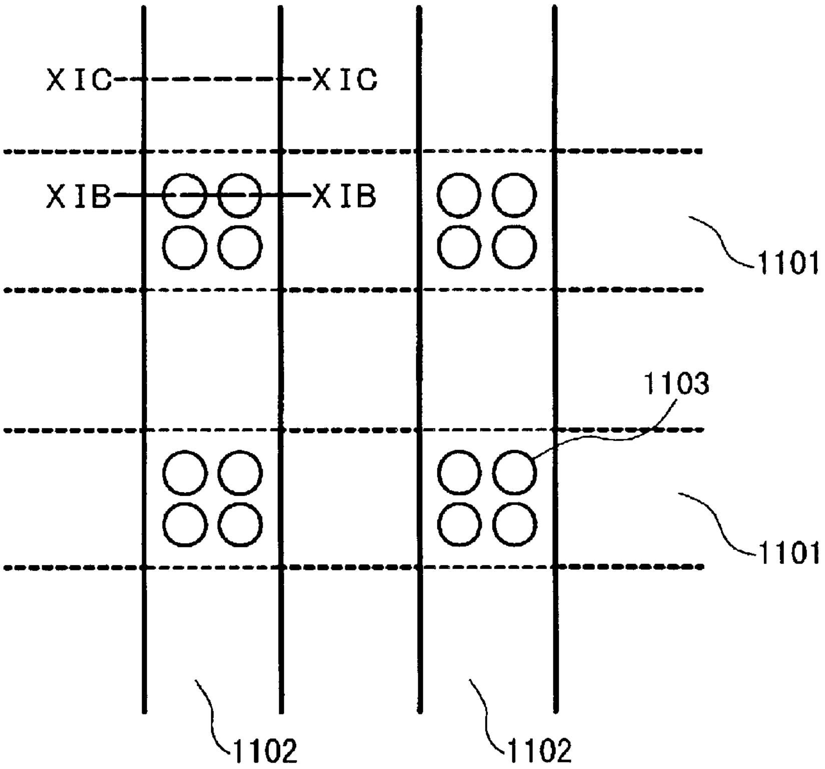
FIGS. 11A to 11C are diagrams for explaining a detailed structure of the electron emitter plate of a fifth embodiment of the invention.
Figure 11B:
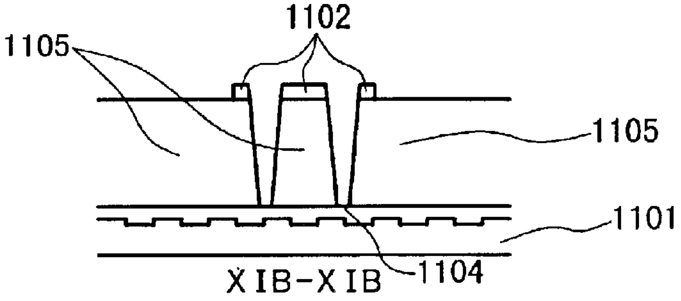
Figure 11C:
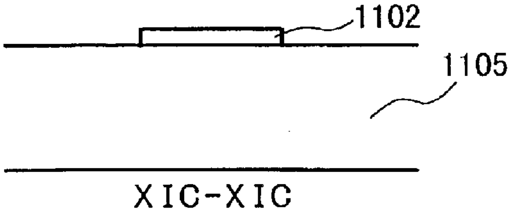

Next, a fifth embodiment of the invention will be described with reference to FIGS. 11A to 11C and FIGS. 12A to 12C. Referring first to FIGS. 11A to 11C, the structure of an electron emitter plate will be described. FIG. 11A is a plane view, FIG. 11B is a sectional view indicated by XIB—XIB on FIG. 11A and FIG. 11C is a sectional view indicated by XIC—XIC on FIG. 11A.

Firstly, 600 cathode electrode stripes 1101 each having a thickness of 1 to 30 μm and a width of 300 μm are formed at intervals of 60 μm on the surface of a glass substrate. After fine recess structures are formed on the surface of each cathode electrode stripe 1101, electron emitter layers 1104 each containing fine fibered structure substances or carbon nanotubes are formed on the fine recess structures.

Subsequently, an insulating layer 1105 is formed. The insulating layer 1105 has a thickness of 1 to 100 μm and is formed with electron emitter holes 1103 each having a diameter of 5 to 80 μm at each intersection of the cathode electrode stripe 1101 and gate electrode stripe 1102. After the insulating layer 1105 is sintered at 550° C., 2400 gate electrode stripes 1102 each having a thickness of 1 to 30 μm and a width of 90 μm are formed at intervals of 30 μm on the sintered insulating layer.

Structurally, each gate electrode stripe 1102 is also formed with the same electron emitter holes 1103 as those in the insulating layer 1105 at each intersection of the cathode electrode stripe 1101 and the gate electrode stripe 1102.

With the wiring structure fabricated as above, an image can be displayed by inputting a scanning signal to the cathode electrode stripe 1102 and an image signal to the gate electrode stripe structure 1102 and further applying an acceleration voltage between the cathode electrode stripe 1101 and the anode electrode provided on the phosphor plate of FIG. 3.

Also, with the gate structure of the invention, the distance between the gate electrode and the tip of the fine carbon fibers such as carbon nonatubes can be controlled in μm orders and therefore, a low gate operating voltage (10 V or less) can be realized. Further, since the density of the fine fibered structure substances or carbon nanotubes oriented vertically to the substrate is increased drastically, uniform electron emission characteristics having an electron emission point density of 10,000 electrons/cm$^2$ or more can be realized.

Next, details of an electron emitter fabrication process will be described with reference to FIGS. 12A to 12C. As shown in FIG. 12A as a plane view and FIG. 12B as a sectional view indicated by XIIB—XIIB on FIG. 12A, 600 cathode electrode stripes 1201 each having a width of 300 μm are formed at intervals of 60 μm on a glass substrate. Subsequently, fine recess structures are formed on the surface of each cathode electrode stripe 1201.

Any one of the gold plating method of FIGS. 6A to 6H, the sputter etching method of FIGS. 7A to 7D and the fine particle paste printing method of FIGS. 8A to 8D may be used for formation of the fine recess structures. The fine recess structures may be formed over the entire surface of the cathode electrode stripe 1201 but alternatively, it suffices that the fine recess structures may be formed over the entire bottom of each electron emitter hole 1203 as shown in FIG. 12C as a plane view and FIG. 12D as a sectional view indicated by XIID—XIID on FIG. 12C. In this case, the fine recess structures need to be formed in an area about 10 μm larger than the electron emitter hole pattern by taking the process margin into consideration.

As shown in FIGS. 12A and 12B, a solution containing multi-wall carbon nanotubes of 2 μm average length by 0.1 mg/ml concentration is coated, through ink jet process, on the cathode electrode stripes 1201 each having its surface formed with the fine recess structures, thereby forming electron emitter layers 1204. By preparing the electron emitter layers 1204 in this manner, the carbon nanotubes can be arranged vertically to the substrate. The fine fibered structure substances or carbon nanotubes have an average length of 2 μm and the fine recess structures formed on the surface of each cathode electrode 1201 have an average recess depth of 1 μm and an average recess opening diameter of 1 μm.

Through this process, the fine fibered structure substances or carbon nanotubes could be oriented vertically to the substrate. The electron emitter stripe 1204 may be formed over the entire surface of the substrate or over the entire surface of each cathode electrode stripe 1201 but it suffices that the electron emitter stripe may be formed over the entire bottom of the electron emitter hole or on part of the surface of cathode electrode stripe where the fine recess structures are formed. Subsequently, dielectric paste is screen-printed and sintered at 550° for 30 minutes in the atmosphere to form a dielectric layer 1205.

Structurally, the dielectric layer is formed with electron emitter holes 1203 each having a diameter of 30 μm and it has a thickness of 20 μm. Subsequently, silver paste is screen-printed on the dielectric layer and sintered at 500° for 30 minutes in the atmosphere to form gate electrode stripes 1202 as shown in FIG. 12E as a plane view, FIG. 12F as a sectional view indicated by XIIF—XIIF on FIG. 12E, and FIG. 12G as a sectional view indicated by XIIG—XIIG on FIG. 12E.

Here, 2400 gate electrode stripes 1202 each having a width of 90 μm are formed at intervals of 30 μm. Each gate electrode stripe 1202 has a thickness of 10 μm and is formed with hole structures of the same or slightly larger size than that of the hole structures in insulating layer 1205 in register with them.

With the wiring structure fabricated as above, an image can be displayed by inputting a scanning signal to the cathode electrode stripe 1201 and an image signal to the gate electrode stripe structure 1202 and further applying an acceleration voltage between the cathode electrode stripe 1201 and the anode electrode provided on the phosphor plate of FIG. 3. According to the gate structure of the invention, the distance between the gate electrode and the tip of the fine carbon fibers such as carbon nanotubes can be controlled in μm orders and consequently, a low gate operating voltage (10 V or less) can be realized.

Further, since the density of the fine fibered structure substances such as carbon nanotubes oriented vertially to the substrate is increased drastically, uniform electron emission characteristics having an electron emission point density of 10,000 electrons/cm$^2$ can be realized.

While in the present embodiment the cathode electrode stripe 1201 and gate electrode stripe 1202 are formed from a specified metal but any metal having necessary electric conduction properties can also be used. Alloy may also be used.

The carbon nanotubes are coated to desired positions through ink jet process but they may also be arranged on the bottom of electron emitter hole 1203 through any other method.

The surface recess structures of cathode electrode stripe 1201 having 1 μm average recess depth and 1 μm average recess opening diameter are used and the carbon nanotubes having 2 μm average length are used but any fine recess structures and fine fibered substances or carbon nanotubes may also be used provided that the recess structure has a depth of 3 μm or less.

Figure 13A:
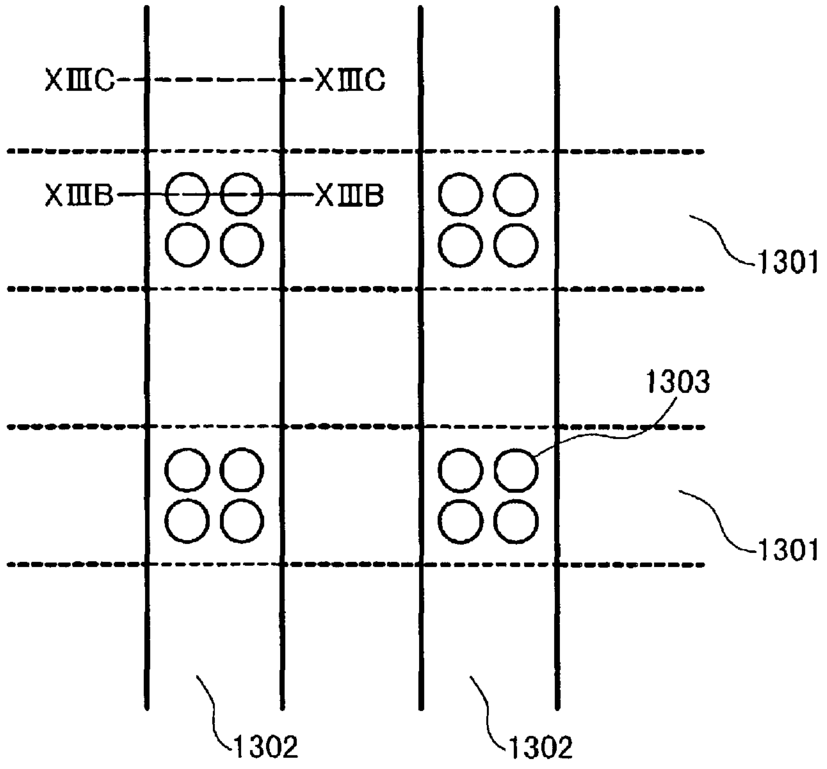
FIGS. 13A to 13C are diagrams for explaining a detailed structure of the electron emitter plate of a sixth embodiment of the invention.
Figure 13B:
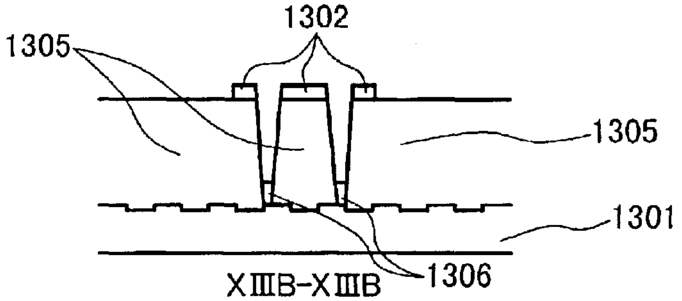
Figure 13C:
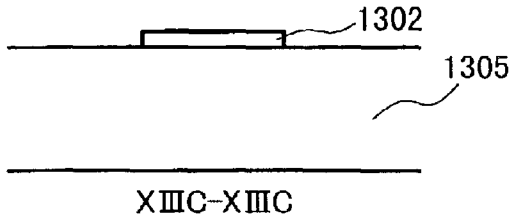

Next, a sixth embodiment of the invention will be described with reference to FIGS. 13A to 13C and FIGS. 14A to 14G. Firstly, the structure of the electron emitter plate will be described with reference to FIGS. 13A to 13C. FIG. 13A is a plane view, FIG. 13B is a sectional view indicated by XIIIB—XIIIB on FIG. 13A and FIG. 13C is a sectional view indicated by XIIIC—XIIIC on FIG. 13A.

Firstly, 600 cathode electrode stripes 1301 each having a thickness of 1 to 30 μm and a width of 300 μm are formed at intervals of 60 μm on the surface of a glass substrate. Fine recess structures are formed on the surface of each cathode electrode stripe 1301. An insulating layer 1305 is formed on the fine recess structures.

Structurally, the insulating layer 1305 has a thickness of 1 to 100 μm and is formed with electron emitter holes 1303 each having a diameter of 5 to 80 μm at each intersection of the cathode electrode stripe 1301 and gate electrode stripe 1302. After the insulating layer 1305 is sintered at 550° C., 2400 gate electrode stripes 1302 each having a thickness of 1 to 30 μm and a width of 90 μm are formed at intervals of 30 μm on the sintered insulating layer. Structurally, each gate electrode stripe 1302 is also formed with the same electron emitter holes 1303 as those in the insulating layer 1305 at each intersection of the cathode electrode stripe 1301 and gate electrode stripe 1302.

Finally, a solution containing the fine fibered structure substances or carbon nanotubes are ink-jetted to the bottoms of the electron emitter holes 1303 to form electron emitter layers 1306.

The fine fibered structure substances or carbon nanotubes have 2 μm average length and the fine recess structures formed on the surface of each cathode electrode 1301 have 1 μm average recess depth and 1 μm average recess opening diameter. Through this process, the fine fibered structure substances or carbon nanotubes can be oriented vertically to the substrate.

With the wiring structure fabricated in this manner, an image can be displayed by inputting a scanning signal to the cathode electrode stripe 1301 and an image signal to the gate electrode stripe structure 1302 and further applying an acceleration voltage between the cathode electrode stripe 1301 and the anode electrode provided on the phosphor plate of FIG. 3.

According to the gate structure of the invention, the distance between the gate electrode and the tip of the fine carbon fibers such as carbon nanotubes can be controlled in μm orders and consequently, a low gate operating voltage (10 V or less) can be realized.

Further, since the density of the fine fibered structure substances or carbon nanotubes oriented vertically to the substrate is increased drastically, uniform electron emission characteristics having an electron emission point density of 10,000 electrons/cm$^2$ or more can be realized.

Figures 14A, 14B:
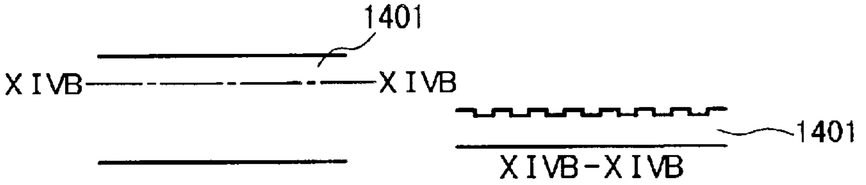
FIGS. 14A to 14G are diagrams for explaining the electron emitter plate of the sixth embodiment of the invention.

Next, details of an electron emitter fabrication process will be described with reference to FIGS. 14A to 14G. As shown in FIG. 14A as a plane view and FIG. 14B as a sectional view indicated by XIVB—XIVB on FIG. 14A, 600 cathode electrode stripes 1401 each having a width of 300 μm are formed at intervals of 60 μm on a glass substrate.

Subsequently, fine recess structures are formed on the surface of each cathode electrode stripe 1401. Any one of the gold plating method of FIGS. 6A to 6H, the sputter etching process of FIGS. 7A to 7D and the fine particle paste printing method of FIGS. 8A to 8D may be used for formation of the fine recess structures.

Figures 14C, 14D:
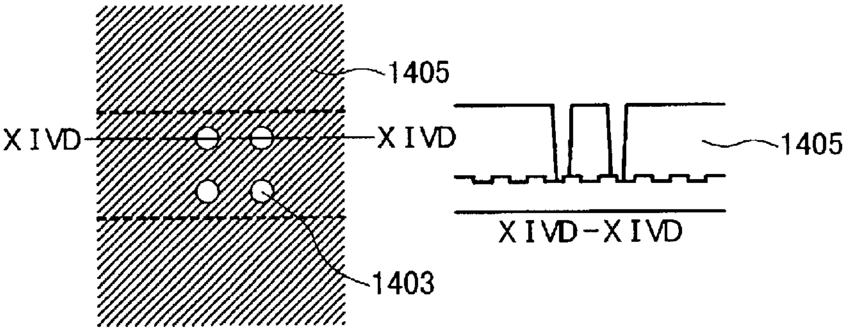

The fine recess structures may be formed over the entire surface of the cathode electrode stripe 1401 but alternatively, it suffices that the fine recess structures may be formed over the entire bottom of each electron emitter hole 1403 as shown in FIG. 14C as a plane view and FIG. 14D as a sectional view indicated by XIVD—XIVD on FIG. 14C. In this case, the fine recess structures need to be formed in an area about 10 μm larger than the electron emitter hole pattern by taking the process margin into consideration.

Subsequently, dielectric paste is screen-printed and sintered at 550° for 30 minutes in the atmosphere to form a dielectric layer 1405. Structurally, the dielectric layer is formed with electron emitter holes 1403 each having a diameter of 30 μm and it has a thickness of 20 μm.

Figures 14E, 14F, 14G:
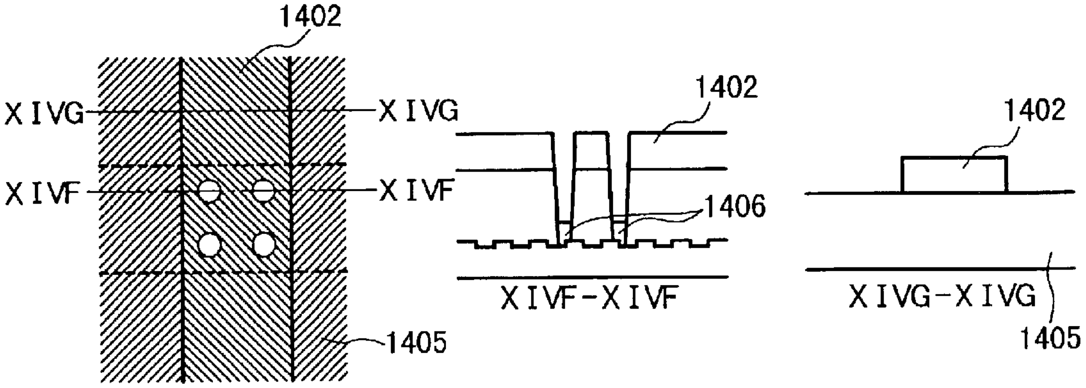

Thereafter, silver paste is screen-printed on the dielectric layer and sintered at 500° for 30 minutes in the atmosphere to form gate electrode stripes 1402 as shown in FIG. 14E as a plane view, FIG. 14F as a sectional view indicated by XIVF—XIVF on FIG. 14E, and FIG. 14G as a sectional view indicated by XIVG—XIVG on FIG. 14E.

Here, 2400 gate electrode stripes 1402 each having a width of 90 μm are formed at intervals of 30 μm. Each gate electrode stripe 1402 has a thickness of 10 μm and is formed with hole structures of the same or lightly larger size than that of the hole structures in insulating layer 1405 in register with them.

Finally, a solution containing the fine fibered structure substances or carbon nanotubes are ink-jetted to the bottoms of the electron emitter holes 1403 to form electron emitter layers 1406.

The fine fibered structure substances or carbon nanotubes have 2 μm average length and the fine recess structures formed on the surface of each cathode electrode 1401 have 1 μm average recess depth and 1 μm average recess opening diameter. Through this process, the fine fibered structure substances or carbon nanotubes can be oriented vertically to the substrate.

With the wiring structure fabricated in this manner, an image can be displayed by inputting a scanning signal to the cathode electrode stripe 1401 and an image signal to the gate electrode stripe structure 1402 and further applying an acceleration voltage between the cathode electrode stripe 1401 and the anode electrode provided on the phosphor plate of FIG. 3.

According to the gate structure of the invention, the distance between the gate electrode and the tip of the fine carbon fibers such as carbon nanotubes can be controlled in μm orders and consequently, a low gate operating voltage (10 V or less) can be realized. Further, since the density of the fine fibered structure substances or carbon nanotubes oriented vertically to the substrate is increased drastically, uniform electron emission characteristics having an electron emission point density of 10,000 electrons/cm$^2$ or more can be realized.

While in the present embodiment the cathode electrode stripe 1401 and gate electrode stripe 1402 are formed from a specified metal, any metal having necessary electric conduction properties can also be used. Alloy may also be used.

The carbon nanotubes are coated to desired positions through ink jet process but they may be arranged at the bottoms of the electron emitter holes 1403 through any other method.

The surface recess structures of cathode electrode stripe 1401 having 1 μm average recess depth and 1 μm average recess opening diameter are used and the fine fibered substances or carbon nanotubes having 2 μm average length are used but any fine recess structures and fine fibered substances or carbon nanotubes can also be used provided that the recess structure has a depth of 3 μm or less.

Figure 15:
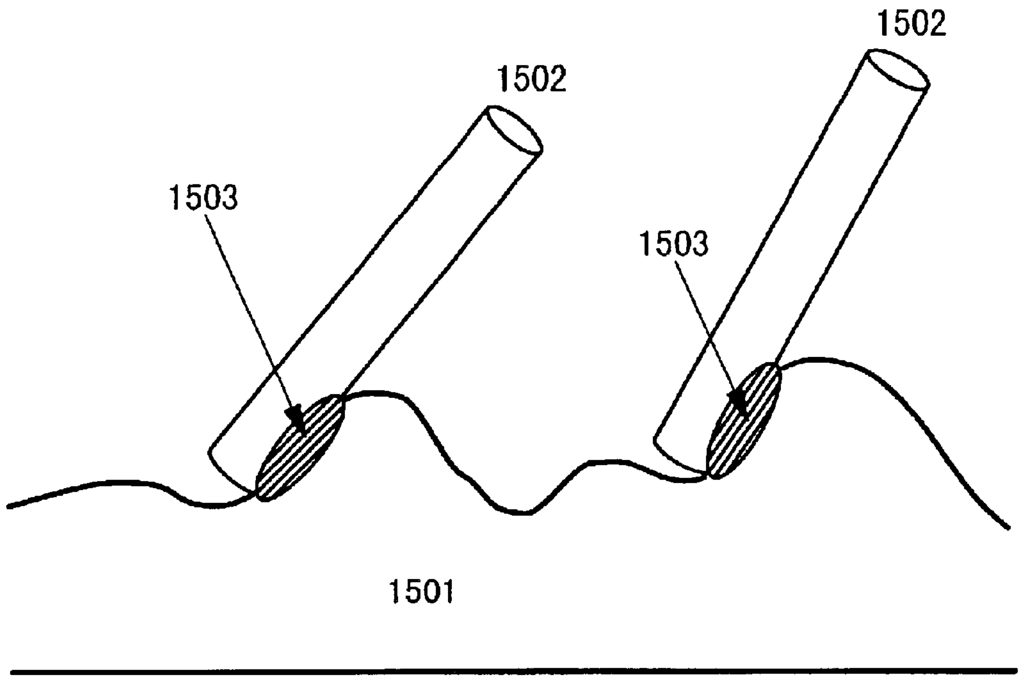
FIG. 15 is a diagram for explaining a structure of a cathode electrode, carbon nanotubes and a compound of a seventh embodiment of the invention.

Referring now to FIG. 15, a seventh embodiment of the invention will be described. In the present embodiment, a method for reducing electrical resistance between the fine fibered substances or carbon nanotubes and the underlying metal will be described.

After fine fibered substances or carbon nanotubes 1502 are arranged on the surface of each cathode electrode 1501 having its surface formed with fine recess structures, a compound 1503 is created by heat treatment or plasma process at contact portions between the fine fibered substances or carbon nanotubes 1502 and the cathode electrode 1501. This compound consists of an element constituting the fine fibered substances or carbon nanotubes and a metal constituting the cathode electrode 1501.

By creating the compound at the contact portions between the fine fibered substances or carbon nanotubes 1502 and the cathode electrode 1501 in this manner, an electrical contact therebetween can be assured. The contact resistance was 1 kilo-ohm or less. Since a uniform low contact resistance can be obtained in a plane, uniform electron emission characteristics having an electron emission point density of 10,000 electrons/cm$^2$ can be realized.

The method for reduction of the contact resistance between the fine fibered substances or carbon nanotubes and the cathode electrode described in connection with the present embodiment can be applicable to all of the first to sixth embodiments set forth so far.

Figure 16:
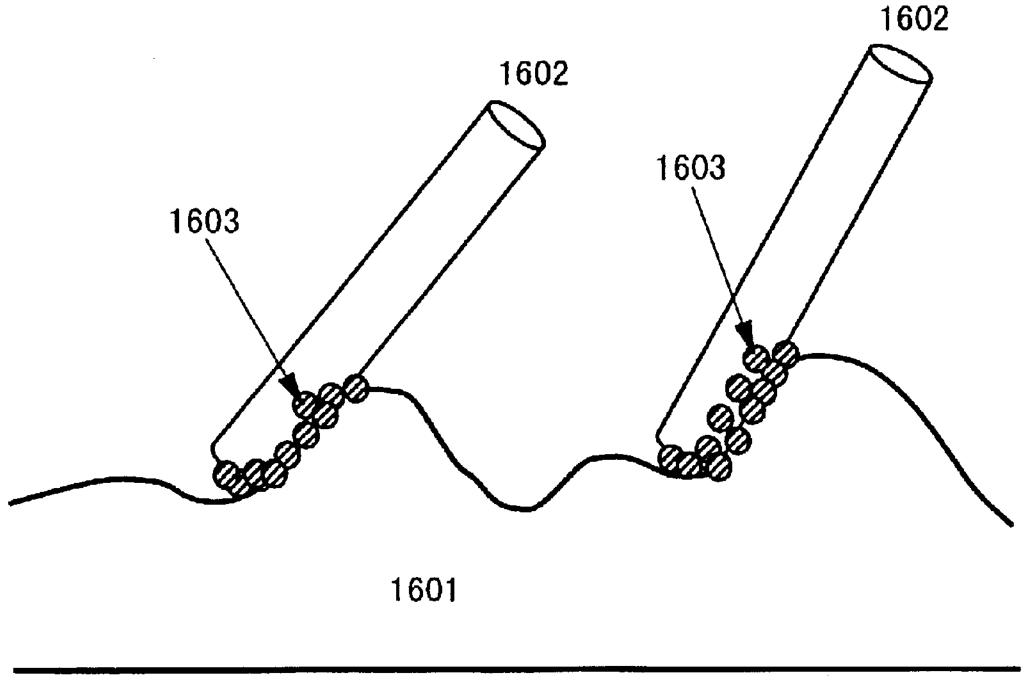
FIG. 16 is a diagram for explaining a structure of a cathode electrode, carbon nanotubes and metal fine particles of an eighth embodiment of the invention.

Referring now to FIG. 16, an eighth embodiment will be described. In the present embodiment, like the seventh embodiment, a method for reducing electrical resistance between the fine fibered substances or carbon nanotubes and the underlying metal will be described.

In the present embodiment, a solution is prepared in which the fine fibered substances or carbon nanotubes 1602 are mixed with metal fine particles 1603. The solution is coated or printed on the surface of each cathode electrode 1601 having its surface formed with fine recess structures and thereafter subjected to a heat treatment.

This process permits the fine fibered substances or carbon nanotubes 1602 to contact the cathode electrode 1601 through the medium of metal fine particles 1603, so that an electrical contact between the two can be assured. The contact resistance was 1 kilo-ohm or less.

Since a uniform low contact resistance can be obtained in a plane in this manner, uniform electron emission characteristics having an electron emission point density of 10,000 electrons/cm$^2$ can be realized.

The method for reduction of the contact resistance between the fine fibered substances or carbon nanotubes and the cathode electrode described in connection with the present embodiment can be applicable to all of the first to sixth embodiments set forth so far.

According to the present invention, most of the fine fibered substances or carbon nanotubes can be oriented vertically to the substrate, with the result that the electric field is concentrated on the fine fibered substances or carbon nanotubes, the electron emission point density is increased drastically and uniform electron emission characteristics can be realized in a plane.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A flat panel display having an electron emitter plate provided with electron emitters formed at an intersection where a cathode electrode stripe intersects with a gate electrode stripe through an insulating film and a phosphor plate provided with phosphors, a space formed between said electron emitter plate and said phosphor plate having a substantially vacuum atmosphere, said display comprising:

holes for said electron emitters formed at said intersection such that said holes penetrate said gate electrode stripe and said insulating film;

a number of fine recess structures formed on a surface of a metal film of said cathode electrode stripe at bottoms of said holes; and a fine fibered substance or carbon nanotubes are disposed in said fine recess structures.

2. A flat panel display according to claim 1, wherein said recess structures have a depth of 3 $\mu$m or less.

3. A flat panel display according to claim 1, wherein said fine fibered substance or carbon nanotubes have an average length L of 0.5 to 3 $\mu$m.

4. A flat panel display according to claim 1, wherein an emission point density of said recess structure is 10000 electrons/cm$^2$ or more.

5. A flat panel display having an electron emitter plate provided with electron emitters formed at an intersection where a cathode electrode stripe intersects with a gate electrode stripe through an insulating film and a phosphor plate provided with phosphors, a space formed between said electron emitter plate and said phosphor plate having a substantially vacuum atmosphere said display comprising:

holes for said electron emitters formed at said intersection such that said holes penetrate said gate electrode stripe and said insulating film;

a number of fine recess structures formed on a surface of a metal film of said cathode electrode stripe at bottoms of said holes; and a fine fibered substance or carbon nanotubes oriented substantially vertically to a substrate and disposed in said fine recess structures.

6. A flat panel display according to claim 5, wherein said recess structures have a depth of 3 $\mu$m or less.

7. A flat panel display according to claim 5, wherein said fine fibered substance or carbon nanotubes have an average length of 0.5 to 3 $\mu$m.

8. A flat panel display according to claim 5, wherein an emission point density of said recess structure is 10000 electrons/cm$^2$ or more.

9. A flat panel display according to claim 1, wherein said fine fibered substance or carbon nanotubes are electrically connected to surfaces of said recess structures through an intervening material.

10. A flat panel display according to claim 9, wherein said intervening material is a compound formed at contact portions between said fine fibered substance or carbon nanotubes and said recess structures.

11. A flat panel display according to claim 9, wherein said intervening material comprises metal particles.

12. A flat panel display according to claim 5, wherein said fine fibered substance or carbon nanotubes are electrically connected to surfaces of said recess structures through an intervening material.

13. A flat panel display according to claim 12, wherein said intervening material is a compound formed at contact portions between said fine fibered substance or carbon nanotubes and said recess structures.

14. A flat panel display according to claim 12, wherein said intervening material comprises metal particles.

15. A flat panel display having an electron emitter plate provided with an electron emitter formed at an intersection where a cathode electrode stripe intersects with a gate electrode stripe through an insulating film, said display comprising:

a hole formed at said intersection such that said hole penetrates said gate electrode stripe and said insulating film;

a recess structure formed on a surface of a metal film of said cathode electrode stripe at a bottom of said holes; and a fine fiber or a carbon nanotube disposed in said recess structure.

16. The display of claim 15, wherein said fine fiber or carbon nanotube is oriented substantially vertically relative to a substrate.

17. The display of claim 15, wherein said fine fiber or carbon nanotube is electrically connected to a surface of said recess structure through an intervening material.

18. The display of claim 17, wherein said intervening material is a compound formed at a contact portion between said fine fiber or carbon nanotube and said recess structure.

19. The display of claim 17, wherein said intervening material comprises metal particles.

* * * * *